United States Patent

Billion et al.

[11] Patent Number: 5,395,605
[45] Date of Patent: Mar. 7, 1995

[54] LOW WATER UPTAKE PRECIPITATED SILICA PARTICULATES

[75] Inventors: Jacques Billion, Saint Jean De Niost; Yvonick Chevallier, Decines; Jean-Claude Morawski, Chassieu, all of France

[73] Assignee: Rhone-Poulenc Chimie, Courbevoie, France

[21] Appl. No.: 696,995

[22] Filed: May 3, 1991

Related U.S. Application Data

[63] Continuation of Ser. No. 160,346, Feb. 25, 1988, abandoned.

[30] Foreign Application Priority Data

Feb. 25, 1987 [FR] France .................. 87 02478

[51] Int. Cl.⁶ .......................... C01B 33/14
[52] U.S. Cl. ........................ 423/339; 424/49
[58] Field of Search ............. 423/335, 339; 424/49

[56] References Cited

U.S. PATENT DOCUMENTS

| | | | |
|---|---|---|---|
| 4,015,031 | 3/1977 | Reinhardt et al. | 427/213 |
| 4,462,974 | 7/1984 | Pastor et al. | 423/335 |
| 4,465,656 | 8/1984 | Pastor et al. | 423/335 |
| 4,508,606 | 4/1985 | Winyall | 204/180 P |
| 4,590,052 | 5/1986 | Chevallier et al. | 423/335 |
| 4,704,225 | 11/1987 | Lagarde et al. | 423/339 |
| 4,717,561 | 1/1988 | Krivak | 423/335 |
| 5,009,874 | 4/1991 | Parmentier et al. | 423/335 |

FOREIGN PATENT DOCUMENTS

| | | |
|---|---|---|
| 0018866 | 11/1980 | European Pat. Off. . |
| 1056218 | 11/1080 | France . |
| 1111969 | 3/1956 | France . |
| 2075083 | 10/1971 | France . |

*Primary Examiner*—Olik Chaudhuri
*Assistant Examiner*—Ken Horton
*Attorney, Agent, or Firm*—Burns, Doane, Swecker & Mathis

[57] ABSTRACT

Novel precipitated silica particulates having low water uptake and high BET and CTAB surfaces, well adapted as reinforcing fillers for, e.g., the silicones, are conveniently prepared by heat treating certain starting material precipitated silica particulates at a temperature of at least 700° C., for at least one minute.

17 Claims, No Drawings

LOW WATER UPTAKE PRECIPITATED SILICA PARTICULATES

This application is a continuation of application Ser. No. 07/160,346, filed Feb. 25, 1988, now abandoned.

BACKGROUND OF THE INVENTION

1. Field of the Invention

The present invention relates to novel precipitated silica particulates having a low water uptake, a process for the preparation thereof, and to the use of such precipitated silica particulates for the reinforcement of, e.g., silicone elastomers and silicone pastes.

2. Description of the Prior Art

It is known to this art to use the pyrogenic silica particulates as reinforcing fillers for vulcanizable organopolysiloxane compositions. However, the pyrogenic silicas suffer the disadvantage of being quite costly.

For many years, numerous attempts have been made to replace, at least in part, the pyrogenic silicas with the less expensive precipitation silicas. Various processes have been proposed to the art for the preparation of the precipitated silicas, complex processes, according to which such parameters as temperature, reagent concentrations, pH values, etc., need be carefully controlled (French Patent No. 1,352,354).

Attempts have also been made to improve the properties of precipitation silica for silicone applications by rendering the silica hydrophobic via appropriate surface treatments (using, for example, appropriate silane or silazane). Hydrophilic silicas made hydrophobic by such treatments and useful for silicone applications are described, for example, in French Patent No. 2,356,596. However, these treatments impart considerable cost to such processes.

An improved precipitated silica useful for the reinforcement of organopolysiloxane elastomers has been described (International Rubber Conference, Kiev, Oct. 10–14, 1978). Precipitation silicas of such type may have valuable properties, but are still inadequate relative to water uptake, this latter characteristic being essential for all silicone applications and in particular with regard to the dielectric properties of the final compositions, which are important in the more specialized applications, such as for the manufacture of cables.

SUMMARY OF THE INVENTION

Accordingly, a major object of the present invention is the provision of an improved precipitated silica characterized by low water uptake.

Another object of this invention is the provision of improved precipitated silica particulates having low water uptake and surface and dispersibility properties adapted for use as reinforcing filler material for elastomeric matrices.

Yet another object of this invention is the provision of an especially simple and economical process for the preparation of such improved silica particulates.

Briefly, the present invention features a silica displaying low water uptake, the process for the production of such novel silica being characterized in that a first precipitation silica is subjected to a heat treatment at a temperature of at least 700° C. for at least one minute.

DETAILED DESCRIPTION OF THE PREFERRED EMBODIMENTS OF THE INVENTION

More particularly according to the present invention, in a preferred embodiment thereof, the starting material silica is in the form of essentially spherical particulates having a mean particle size greater than 80 μm.

Nonetheless, the characteristic silicas of this invention embody two particular embodiments.

In a first embodiment, the subject silicas have the following properties:
 (i) BET surface area: 100–350 m$^2$/g,
 (ii) CTAB surface area: 100–350 m$^2$/g,
 (iii) Water uptake: ≦4.5%.

Furthermore, these silica materials are in the form of essentially spheroidal particulates having a mean dimension larger than 80 μm.

In a second embodiment, the precipitated silicas have the following properties:
 (i) BET surface area: 135–350 m$^2$/g,
 (ii) CTAB surface area: 150–350 m$^2$/g,
 (iii) Water uptake: 4.5%.

The silica particulates according to the invention, prepared by the above process, have a low water uptake in combination with large specific surfaces. They may also have a low density, dictating their incorporation in organopolysiloxane compositions to impart high strength properties thereto.

Furthermore, the preparative process which is based essentially on a heat treatment, is particularly simple and is well suited for industrial use.

The silica particulates according to the invention, depending upon the respective process for the production thereof, are characterized firstly by their BET surface. This BET surface is determined by the method of Brunauer-Emmett-Teller, described in *Journal of the American Chemical Society*, Vol..60, page 309 (February 1938).

The silica particulates of the invention are further characterized by their CTAB surface. This surface is determined by the adsorption of cetyl-trimethylammonium bromide at pH 9, according to the method of Jay-Jansen Kraus (*Rubber Chemistry and Technology*, 44, pp. 1287–1296 (1971)).

The silica particulates according to the invention are further characterized in all the cases by a water uptake of at the most 4.5%, more particularly 3%.

Such water uptake represents the amount of water adsorbed by a silica sample under conditions of given relative humidity.

Consistent herewith, water uptake is measured in the following manner:

Initially, the sample is subjected to desorption at 120° C. under a stream of nitrogen, until a constant weight is obtained. It is then cooled under a stream of dry nitrogen to 23° C. Subsequently, a stream of dry nitrogen saturated with water vapor is passed over the sample, under conditions such that the temperature of the sample is always 23° C. and the relative humidity at the level of the sample is 64%. The water uptake is measured by weight percentage relative to the dry material.

The silica particulates of the invention have certain other characteristics.

Thus, they have a maximum residual sodium content of 1,500 ppm and more particularly less than 1,000 ppm. This content is measured by flame spectroemission following the dissolution of the silica by hydrofluoric acid.

The same silicas also have a carbon content of less than 2,500 ppm and more particularly less than 500 ppm.

In accordance with the aforesaid first embodiment, the silica particulates have BET and CTAB surfaces ranging from 100 to 350 m²/g.

A further characteristic of the silica particulates per this first embodiment is their specific shape, i.e., essentially spheroidal globules having a mean particle size of at least 80 μm.

More particularly, this mean dimension may be larger than 150 μm and preferably ranges from 200 to 300 μm.

Also, the silica particulates per this first embodiment have a density ranging from 0.23 to 0.32.

In the second embodiment according to the invention, the silica particulates are the most suitable for the reinforcement of silicone elastomers; they have a BET surface ranging from 135 to 350 m²/g and a CTAB surface of from 150 to 350 m²/g.

The silica particulates of this second embodiment have a density at most equal to 0.3 and more preferably up to 0.15. As in the case of the first embodiment, this is the tamped density according to AFNOR Standard No. 030100.

Generally, the pH of the silica of the second embodiment of the invention ranges from 3.5 to 7.5 and more particularly from 4.5 to 6.5. This pH value is measured on a 5% silica suspension in water.

Finally, the size of the particles of the same silica, estimated by the residue remaining on a 45 μm screen, is preferably less than or equal to 0.05%.

The process for the preparation of the silica according to the invention will now be described.

The starting material for such process comprises a precipitation silica, hereinafter designated the "beginning silica". Such silica may be prepared by any known means, e.g., the processes described in French Patent Nos. 2,471,947 and 2,562,534. It must have the BET and CTAB specifications and the residual sodium content mentioned above.

However, in a preferred embodiment of the invention, the beginning silica is a material in the form of globules or beads of the type described in EP 18,866, hereby incorporated by reference.

More particularly, it comprises a silica in the form of essentially spherical beads and having a mean dimension of at least 80 μm, more particularly larger than 150 μm and preferably ranging from 200 to 300 μm.

This beginning silica may also have a tamped density greater than 0.2 and preferably ranging from 0.25 to 0.32.

It is further characterized by a BET surface of from 100 to 350 m²/g.

The CTAB surface of this beginning silica also ranges from 100 to 350 m²/g.

The starting material silica is facilely prepared by the process described in EP 18,866, i.e., by the atomization of a suspension resulting from a precipitation reaction, with said suspension having a pH of at least 4, preferably ranging from 4.5 to 6, and a dry solids content higher than 18% and advantageously ranging from 20 to 25%. Preferably, this suspension has a viscosity, measured at a velocity gradient of $10^3 \text{sec}^{-1}$ of from 100 to 1,000 poises Sodium impurities are removed from the aforedescribed silica by one or more treatments with deionized water, such treatment including resuspending in deionized water the cake of silica obtained after filtration of the suspension, and refiltering the suspension which is obtained after this treatment.

The essential attribute of the process of the invention is the heat treatment. It is carried out at an elevated temperature, i.e., at least 700° C. It takes place over a short period of time, generally less than one minute and usually from one to fifteen minutes, preferably from two to ten minutes.

The temperature typically ranges from 700° to 950° C.

In general, i.e., employing any first precipitation silica, the temperature will more particularly range from 800° to 900° C. If the beginning silica is in the form of beads, the temperature preferably ranges from 700° to 900° C.

The heat treatment may be carried out in any suitable apparatus. Typically, an inclined rotating furnace is used.

The process of the invention may comprise the additional stage of micronization or grinding.

The purpose of this stage is to lower the density of the final product. Micronization may be carried out by means of apparatus of the "JET-O-MIZER" type and the like, described in Perry's *Chemical Engineer's Handbook*, 5th edition, Section 8/83.

Grinding may be carried out by any known means which enable imparting the desired grain size distribution and density.

This treatment is especially applicable in cases where a final product well adapted for the reinforcement of silicone elastomers is desired.

The two stages of heat treatment and micronization or grinding may be carried out in any respective order.

However, in a preferred embodiment of the invention, the heat treatment is carried out first and then the micronization. This technique is particularly advantageous in the case of the starting material silica being in the form of beads, because this form facilitates the heat treatment.

The particularly surprising results obtained by the heat treatment of the beginning silica being in the form of beads will now be described. These results are surprising for two reasons. First, the high temperature at which the heat treatment is carried out makes it possible to obtain the low water uptake value for the silica treated in this manner. At the same time, and while contrary to that which would have been expected, the specific surface of the final product silica is retained—this in spite of the high treatment temperature.

On the other hand, in the case of silica beads, this same high temperature heat treatment should cause a very extensive hardening of the initial beads. But, while such hardening does occur, it remains relatively low and in any event is such that the subsequent grinding and or micronization of the product results in no overall problems, when carried out industrially.

The silica particulates produced in this manner are especially suitable for use as fillers for organosilicic compositions.

The nature of the organosilicic compositions capable of being reinforced after vulcanization by the silica described above, is not critical. In general, such organosilicic compositions are elastomers or pastes.

In the case of elastomeric compositions, the vulcanizable organosilicic polymer used is such that, if R stands for the hydrocarbon radicals bonded to the silicon atoms, the ratio between the total number of R radicals and the total number of silicon atoms ranges from 0.5 to 3. In the structure of the organosilicic polymers, the other available valences of silicon are satisfied by bonding to heteroatoms, such as oxygen or nitrogen, or else to multivalent hydrocarbon radicals.

Preferably, the organosilicic compositions reinforced according to the invention are organopolysiloxane compositions, in which the organopolysiloxane may be linear or branched, and may optionally contain, in addition to the hydrocarbon radicals, reactive functional groups, such as, for example, hydroxyl groups, hydrolyzable groups, alkenyl groups, hydrogen atoms, and the like.

More precisely, the organopolysiloxanes which are the principal components of the compositions according to the invention are comprised of siloxane recurring units of the general formula:

$$R_n SiO_{(4-n)/2} \quad (I)$$

optionally in combination with siloxane recurring units of the formula:

$$Z_x R_y SiO_{(4-x-y)/2} \quad (II)$$

In these formulae, the different symbols have the following definitions:

R is a group of the nature of a nonhydrolyzable hydrocarbon, which may be:

(i) an alkyl or alkyl halide radical having from 1 to 5 carbon atoms and containing from 1 to 6 chlorine and/or fluorine atoms, (ii) a cycloalkyl or cycloalkyl halide radical having from 3 to 8 carbon atoms and containing from 1 to 4 chlorine and/or fluorine atoms, (iii) an aryl, alkylaryl and aryl halide radical having from 6 to 8 carbon atoms and containing from 1 to 4 chlorine and/or fluorine atoms, (iv) a cyanoalkyl radical having from 3 to 4 carbon atoms;

Z is a hydrogen atom, an alkenyl radical, a hydroxyl group, a hydrolyzable atom, or a hydrolyzable group;

n is an integer equal to 0, 1, 2 or 3;

x is an integer equal to 0, 1, 2 or 3;

y is an integer less than or equal to 2.

Exemplary of the organic radicals R directly bonded to silicon atoms, representative are:

methyl, ethyl, propyl, isopropyl, butyl, isobutyl, α-pentyl, t-butyl, chloromethyl, dichloromethyl, α-chloroethyl, α,β-dichloroethyl, fluoromethyl, difluoromethyl, α,β-difluoroethyl, 3,3,3-trifluoropropyl, trifluorocyclopropyl, 4,4,4-trifluoropropyl, 3,3,4-heptafluoro-4,5,5-pentyl, β-cyanoethyl, τ-cyanopropyl, phenyl, p-chlorophenyl, m-chlorophenyl, 3,5-dichlorophenyl, trichlorophenyl, tetrachlorophenyl, o-, p- or m-tolyl, α,α,α-trifluorotolyl, xylyls such as 2,3-dimethyl-phenyl, 3,4-dimethyl phenyl groups.

Preferably, the organic radicals bonded to the silicon atoms are optionally halogenated methyl, phenyl, vinyl radicals, or they may be cyanoalkyl radicals.

Z may be a hydrogen atom, chlorine atom, vinyl radical, hydroxyl or hydrolyzable group, such as the amino, amido, aminoxy, oxime, alkoxy, alkoxyalkoxy, alkenyloxy, acyloxy groups, etc.

The nature of the organopolysiloxane and thus the ratio of the siloxane units (I) and (II) and the distribution thereof is, as mentioned above, selected as a function of the intended application of the composition and as a function of the vulcanization treatment.

They may be compositions vulcanizable at elevated temperatures under the action of organic peroxides such as 2,4-benzoyl peroxide, benzoyl peroxide, t-butyl perbenzoate, cumyl peroxide, di-t-butyl peroxide, etc.

The organopolysiloxanes of such compositions thus consist essentially of siloxane units (I) and do not contain hydrolyzable groups or atoms.

The polymethylpolysiloxanes terminating in trimethylsilyl groups constitute a particularly preferred example of this category, for industrial applications.

The vulcanization may also be carried out at ambient temperature or at a moderate temperature by effecting crosslinking between the vinylsilyl groups and the hydrogenosilyl groups, with the hydrosilylation reaction being carried out in the presence of catalysts, such as platinum derivatives. The organopolysiloxanes thus used do not contain hydrolyzable atoms or groups.

Vulcanization may be carried out under the action of moisture, or of humidity. The organopolysiloxanes contained in the compositions of this type contain hydrolyzable atoms or groups such as those defined above. Siloxane units (II) containing such groups constitute at most 15% by weight of the total weight of the organopolysiloxane composition. The organopolysiloxane compositions of this type generally contain catalysts, such as tin salts.

Finally, vulcanization may be carried out in the presence of crosslinking agents. The organopolysiloxanes of these particular compositions generally are linear, branched or crosslinked polysiloxanes including units (I) and (II), wherein Z is a hydroxyl group and x is at least equal to 1. The crosslinking agent may be a polyfunctional silane, such as methyltriacetoxysilane, isopropyltriacetoxysilane, vinyltriacetoxysilane, methyltris(diethylaminoxy)silane, and the like. Various other compounds, such as the silicates, may be used as crosslinking agents.

The organosilic compositions according to the invention advantageously contain 5% to 50% and preferably 10% to 40% precipitation silica optionally treated as defined above. In the case of silicone pastes, the proportion in the silica of the invention generally ranges from 3% to 20%.

Furthermore, in addition to the polysiloxanes, the optionally treated precipitation silica, the crosslinking agents, the subject compositions may also contain the usual fillers, such as quartz powder, diatomaceous earth, talc, carbon black, carbonate, and the like. The compositions may further contain various conventional additives, such as antistructural agents, heat stabilizers, thixotropic agents, pigments, corrosion inhibitors, etc.

The antistructural agents, also known as plasticizers, are generally organosilicic in nature and are introduced in a proportion of 0 to 20 parts per 100 parts of the organosilicic gum. They make it possible to prevent hardening of the compositions in storage. Among the antistructural agents, silanes with hydrolyzable groups, or low molecular weight, hydroxylated or alkoxylated diorganopolysiloxane oils, are representative. Such compositions are described, for example, in French Patent No. 1,111,969.

Among the heat stabilizers, which are well known to those skilled in this art, exemplary are iron, cerium or manganese salts, oxides and hydroxides. These additives, which may be used either alone or in admixture, generally are introduced in a proportion of 0.01% to 5% relative to the weight of organopolysiloxane gum.

The organopolysiloxane compositions are prepared by mixing together the different ingredients of the composition, as described above. The mixture may be carried out at the ambient temperature or hot.

In order to further illustrate the present invention and the advantages thereof, the following specific examples are given, it being understood that same are intended only as illustrative and in nowise limitative.

EXAMPLE 1

This example describes the preparation of a certain number of types of silica particulates according to the invention.

The starting material was a silica in the form of beads and having the following characteristics:

(1) CTAB surface: 218 $m^2/g$
(2) BET surface: 225 $m^2/g$
(3) Mean dimension: 220 $\mu m$
(4) Density: 0.27
(5) Water uptake: 9.1%

A rotating quartz furnace with a diameter of 80 mm and a length of 1.3 m was used. The retention time was controlled by the inclination of the furnace. The rotating velocity of the furnace was 4.9 rpm. The silica was introduced by means of a funnel and an endless screw, at a flow rate of 100 g/hr.

The retention time in the furnace and the temperature were varied.

The results are reported in Table I. It was found that the heat treatment according to the conditions of the invention did not degrade the specific surface of the beginning silica.

The pH of the final products was 5.7; the residual sodium content thereof was 350 ppm and that of carbon 280 ppm. The particle size and density before micronization were the same as those given above.

TABLE 1

| Retention time | Temperature (°C.) | Water uptake | CTAB ($m^2/g$) | BET ($m^2/g$) |
| --- | --- | --- | --- | --- |
| 2 hr, 30 min | 750 | 3.9 | 215 | 220 |
| 2 hr, 45 min | 750 | 4.0 | 215 | 220 |
| 5 hr, 30 min | 750 | 3.4 | 218 | 220 |
| 5 hr, 30 min | 850 | 2.0 | 201 | 215 |
| 2 hr, 45 min | 850 | 2.4 | 206 | 218 |
| 2 hr, 30 min | 850 | 3.2 | 205 | 217 |

After micronization in the "JET-O-MIZER", the final products had a density of 0.09.

EXAMPLE 2

A silica A was prepared according to the invention using a vibrating furnace, with the heat treatment carried out at 850° C. for 7 hr, 40 min. The beginning silica was a silica B in the form of beads and having the following characteristics:

(1) CTAB surface: 174 $m^2/g$
(2) BET surface: 182 $m^2/g$
(3) Mean dimension: 190 $\mu m$
(4) Density: 0.27
(5) Water uptake: 8.7%

A silica A was produced, which, after micronization in the "JET-O-MIZER", had the following characteristics:

(1) CTAB surface: 165 $m^2/g$
(2) BET surface: 175 $m^2/g$
(3) Density: 0.105
(4) pH: 6.2
(5) Water uptake: 2.7 %
(6) Carbon content 370 ppm
(7) Residual sodium 450 ppm.

EXAMPLE 3

This example relates to the dielectric properties of plate materials reinforced by the silicas A and B described above, by a precipitation silica of the prior art adapted for the reinforcement of silicones, marketed by the DEGUSSA Co. under the trademark "FK 160", described in the publication *Sonderdruck Aus Kautschuk+Gummi Kunststoffe*, No. 2,32, pages 89–93 (1979), and having the following properties: BET surface 160 $m^2/g$, water uptake measured in the abovedescribed manner of 5.8%, and, finally, by a pyrogenic silica marketed by DEGUSSA under the trademark "AEROSIL".

Preparation of the organopolysiloxane composition

Into a two-cylinder laboratory mixer, the following constituents were mixed together:

(i) 50 g of a polydimethylsiloxane gum,
(ii) 3.6 g of an antistructural agent,
(iii) 20 g silica.

The polydimethylsiloxane gum was a devolatilized gum containing 720 mg of Si groups per kg and terminating in trimethysiloxy groups. The viscosity of 25° was $20 \times 10^6$ centipoises, corresponding to a molecular weight on the order of $6 \times 10^5$.

The antistructural agent was a $\alpha,\omega$-hydroxylated polydimethylsiloxane containing 8.3% hydroxyl groups.

The silicas used were those noted above.

The mixture was effected by adding the silica to the siloxane polymer, in portions, over 5 minutes; kneading on a calender was continued for 15 min prior to the addition to the composition thus prepared of 0.25 $cm^3$ of 2,5-dimethyl-2,5-di(tertbutylperoxy)hexane. The resulting mixture was then homogenized for 5 min on the same calender.

The mixture was then placed into a mold designed to produce specimens with a thickness of 2 mm.

The mold was preheated and the vulcanization of the mixture was carried out for 10 min at 170° C. under a pressure of 120 $kg/cm^2$.

The elastomers were studied in this condition and the transverse resistivity was measured on the specimens. It took into account the current passing through the insulator between the measuring electrodes and was independent of the dimensions of the insulator (for an insulator $\rho$ varying from $10^2$ to $10^{16}$ $\Omega cm$, approximately). The measurement was done in accordance with Standard NFC 26215.

The extrudability of the raw mixture was also evaluated, i.e., the condition of not forming bubbles during vulcanization of the extruded rod in a hot air tunnel, due to the water uptake of the previously dried mixture.

The mixture was dried in plates sized to 2 mm in a vacuum oven heated to 170° C. for 1 hr. The water uptake was then measured by gravimetry after a retention time of 15 days in a controlled atmosphere at 20° C. and 100% of humidity. The humidity uptake should be as low as possible, such that the formation of bubbles in the siloxane composition will not take place due to the vaporization of the water reabsorbed during the storage of the mixture.

The results are reported in Table II:

TABLE II

| | Aerosil | FK 160 | B | A |
| --- | --- | --- | --- | --- |
| $\rho$ $\Omega$ cm | $10^{15}$ | $5 \cdot 10^{13}$ | $2.5 \cdot 10^{13}$ | $7 \cdot 10^{14}$ |
| water uptake of | 0.25 | 0.9 | 1.4 | 0.6 |

TABLE II-continued

| | Aerosil | FK 160 | B | A |
|---|---|---|---|---|
| the mixture | | | | |

It will be seen that the silica of the invention is closest to the pyrogenic silicas, particularly relative to transverse resistivity.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Heat treated precipitated silica particulates having a BET surface area of from 100 to 350 m²/g and a CTAB surface area of from 100 to 350 m²/g the water uptake of said particulates, without treatment with a hydrophobization agent, being no greater than about 4.5%.

2. The precipitated silica particulates as defined by claim 1, having a BET surface area of from 135 to 350 m²/g, and a CTAB surface area of from 150 to 350 m²/g.

3. The precipitated silica particulates as defined by claim 1, essentially spheroidal in configuration and having a mean particle size greater than 80 μm.

4. The precipitated silica particulates as defined by claim 1, said water uptake without treatment with a hydrophobization agent being no greater than about 3%.

5. The precipitated silica particulates as defined by claim 1, having a residual sodium content no greater than 1,500 ppm.

6. The precipitated silica particulates as defined by claim 1, having a residual sodium content no greater than 1,000 ppm.

7. The precipitated silica particulates as defined by claim 5, having a carbon content of less than 2,500 ppm.

8. The precipitated silica particulates as defined by claim 5, having a carbon content of less than 500 ppm.

9. The precipitated silica particulates as defined by claim 3, having a mean particle size greater than 150 μm.

10. The precipitated silica particulates as defined by claim 3, having a mean particle size ranging from 200 to 300 μm.

11. The precipitated silica particulates as defined by claim 1, having a density ranging from 0.23 to 0.32.

12. The precipitated silica particulates as defined by claim 2, having a density of at most 0.3.

13. The precipitated silica particulates as defined by claim 2, having a density of at most 0.15.

14. The precipitated silica particulates as defined by claim 12, having a pH ranging from 3.5 to 7.5.

15. The precipitated silica particulates as defined by claim 12, having a pH ranging from 4.5 to 6.5.

16. The precipitated silica particulates as defined by claim 14, no more than 0.05% thereof being retained on a 45 μm mesh screen.

17. The precipitated silica particulates as defined by claim 12, having a ratio of BET surface area/CTAB surface area ranging from 0.9 to 1.2.

* * * * *